United States Patent
Lao

(10) Patent No.: US 8,275,716 B2
(45) Date of Patent: Sep. 25, 2012

(54) METHOD AND SYSTEM FOR SUBSCRIPTION DIGITAL RIGHTS MANAGEMENT

(75) Inventor: Guillermo Lao, Torrance, CA (US)

(73) Assignee: ContentGuard Holdings, Inc., Wilmington, DE (US)

( * ) Notice: Subject to any disclaimer, the term of this patent is extended or adjusted under 35 U.S.C. 154(b) by 2118 days.

(21) Appl. No.: 10/162,698

(22) Filed: Jun. 6, 2002

(65) Prior Publication Data
US 2002/0198846 A1 Dec. 26, 2002

Related U.S. Application Data

(63) Continuation-in-part of application No. 09/867,747, filed on May 31, 2001.

(60) Provisional application No. 60/296,114, filed on Jun. 7, 2001.

(51) Int. Cl.
*G06F 1/00* (2006.01)
*G06F 21/00* (2006.01)

(52) U.S. Cl. ............... 705/51; 705/57; 705/59

(58) Field of Classification Search ............ 705/59, 705/1; 717/168; 713/200
See application file for complete search history.

(56) References Cited

U.S. PATENT DOCUMENTS

| | | | |
|---|---|---|---|
| 3,263,158 A | 7/1966 | Janis | |
| 3,609,697 A | 9/1971 | Blevins et al. | |
| 3,790,700 A | 2/1974 | Callais et al. | |
| 3,798,605 A | 3/1974 | Feistel | |
| 4,159,468 A | 6/1979 | Barnes et al. | |
| 4,200,700 A | 4/1980 | Mäder | |
| 4,200,770 A * | 4/1980 | Hellman et al. | 380/30 |
| 4,218,582 A * | 8/1980 | Hellman et al. | 380/30 |
| 4,220,991 A | 9/1980 | Hamano et al. | |
| 4,272,810 A * | 6/1981 | Gates et al. | 379/88.08 |
| 4,278,837 A | 7/1981 | Best | |
| 4,323,921 A | 4/1982 | Guillou | |
| 4,361,851 A | 11/1982 | Asip et al. | |
| 4,405,829 A * | 9/1983 | Rivest et al. | 380/30 |

(Continued)

FOREIGN PATENT DOCUMENTS
BR 9810967 A 10/2001
(Continued)

OTHER PUBLICATIONS

Blaze et al, "Divertible Protocols and Atomic Proxy Cryptography" 1998 Advances in Cryptography—Euro Crypt International Conference on the Theory and Application of Crypto Techniques, Springer Verlag, DE.

(Continued)

*Primary Examiner* — Evens J Augustin
(74) *Attorney, Agent, or Firm* — Stephen M. Hertzler; Marc S. Kaufman; Reed Smith LLP

(57) ABSTRACT

A system and method for managing use of items having usage rights associated therewith. The system includes an activation device adapted to issue a software package having a public and private key pair, the public key being associated with a user, a license device adapted to issue a license, a usage device adapted to receive the software package, receive the license and allow the user to access the item in accordance with the license, and a subscription managing device adapted to maintain a subscription list including the public key associated with the user. License's is issued by the license device upon verifying presence of the public key in the subscription list corresponding to requested content.

29 Claims, 5 Drawing Sheets

U.S. PATENT DOCUMENTS

| | | | |
|---|---|---|---|
| 4,423,287 A | 12/1983 | Zeidler | |
| 4,424,414 A * | 1/1984 | Hellman et al. | 380/30 |
| 4,429,385 A | 1/1984 | Cichelli et al. | |
| 4,442,486 A | 4/1984 | Mayer | |
| 4,463,387 A * | 7/1984 | Hashimoto et al. | 386/268 |
| 4,528,643 A * | 7/1985 | Freeny, Jr. | 705/52 |
| 4,529,870 A | 7/1985 | Chaum | |
| 4,558,176 A | 12/1985 | Arnold et al. | |
| 4,593,376 A | 6/1986 | Volk | |
| 4,614,861 A | 9/1986 | Pavlov et al. | |
| 4,621,321 A | 11/1986 | Boebert et al. | |
| 4,644,493 A | 2/1987 | Chandra et al. | |
| 4,652,990 A | 3/1987 | Pailen et al. | |
| 4,658,093 A | 4/1987 | Hellman | |
| 4,713,753 A | 12/1987 | Beobert et al. | |
| 4,731,840 A * | 3/1988 | Mniszewski et al. | 380/284 |
| 4,736,422 A | 4/1988 | Mason | |
| 4,740,890 A | 4/1988 | William | |
| 4,782,529 A * | 11/1988 | Shima | 380/44 |
| 4,796,220 A | 1/1989 | Wolfe | |
| 4,803,725 A * | 2/1989 | Horne et al. | 380/44 |
| 4,809,327 A * | 2/1989 | Shima | 380/44 |
| 4,816,655 A | 3/1989 | Musyck et al. | |
| 4,817,140 A | 3/1989 | Chandra et al. | |
| 4,825,306 A * | 4/1989 | Robers | 386/208 |
| 4,827,508 A | 5/1989 | Shear | |
| 4,868,376 A | 9/1989 | Lessin et al. | |
| 4,888,638 A | 12/1989 | Bohn | |
| 4,891,838 A | 1/1990 | Faber | |
| 4,924,378 A | 5/1990 | Hershey et al. | |
| 4,932,054 A | 6/1990 | Chou et al. | |
| 4,937,863 A | 6/1990 | Robert et al. | |
| 4,949,187 A | 8/1990 | Cohen | |
| 4,953,209 A | 8/1990 | Ryder et al. | |
| 4,961,142 A | 10/1990 | Elliott et al. | |
| 4,975,647 A | 12/1990 | Downer et al. | |
| 4,977,594 A | 12/1990 | Shear | |
| 4,999,806 A | 3/1991 | Chernow et al. | |
| 5,010,571 A | 4/1991 | Katznelson | |
| 5,014,234 A | 5/1991 | Edwards | |
| 5,023,907 A | 6/1991 | Johnson et al. | |
| 5,047,928 A | 9/1991 | Wiedemer | |
| 5,050,213 A | 9/1991 | Shear | |
| 5,052,040 A | 9/1991 | Preston et al. | |
| 5,058,162 A | 10/1991 | Santon et al. | |
| 5,058,164 A | 10/1991 | Elmer et al. | |
| 5,103,476 A | 4/1992 | Waite et al. | |
| 5,113,519 A | 5/1992 | Johnson et al. | |
| 5,129,083 A | 7/1992 | Cutler et al. | |
| 5,136,643 A | 8/1992 | Fischer | |
| 5,138,712 A | 8/1992 | Corbin | |
| 5,146,499 A | 9/1992 | Geffrotin | |
| 5,148,481 A | 9/1992 | Abraham et al. | |
| 5,159,182 A | 10/1992 | Eisele | |
| 5,174,641 A | 12/1992 | Lim | |
| 5,183,404 A | 2/1993 | Aldous et al. | |
| 5,191,193 A | 3/1993 | Le Roux | |
| 5,204,897 A | 4/1993 | Wyman | |
| 5,222,134 A | 6/1993 | Waite et al. | |
| 5,235,642 A | 8/1993 | Wobber et al. | |
| 5,247,575 A | 9/1993 | Sprague et al. | |
| 5,255,106 A | 10/1993 | Castro | |
| 5,260,999 A | 11/1993 | Wyman | |
| 5,263,157 A | 11/1993 | Janis | |
| 5,263,158 A | 11/1993 | Janis | |
| 5,276,444 A | 1/1994 | McNair | |
| 5,276,735 A | 1/1994 | Boebert et al. | |
| 5,276,901 A | 1/1994 | Howell et al. | |
| 5,287,408 A | 2/1994 | Samson | |
| 5,291,596 A | 3/1994 | Mita | |
| 5,293,422 A | 3/1994 | Loiacono | |
| 5,301,231 A | 4/1994 | Abraham et al. | |
| 5,311,591 A | 5/1994 | Fischer | |
| 5,319,705 A | 6/1994 | Halter et al. | |
| 5,335,275 A | 8/1994 | Millar et al. | |
| 5,337,357 A | 8/1994 | Chou et al. | |
| 5,339,091 A | 8/1994 | Yamazaki et al. | |
| 5,341,429 A | 8/1994 | Stringer et al. | |
| 5,347,579 A | 9/1994 | Blandford | |
| 5,381,526 A | 1/1995 | Ellson | |
| 5,386,369 A | 1/1995 | Christiano | |
| 5,390,297 A | 2/1995 | Barber et al. | |
| 5,394,469 A | 2/1995 | Nagel et al. | |
| 5,410,598 A | 4/1995 | Shear | |
| 5,412,717 A | 5/1995 | Fischer | |
| 5,414,852 A | 5/1995 | Kramer et al. | |
| 5,428,606 A | 6/1995 | Moskowitz | |
| 5,432,849 A | 7/1995 | Johnson et al. | |
| 5,438,508 A | 8/1995 | Wyman | |
| 5,444,779 A | 8/1995 | Daniele | |
| 5,453,601 A | 9/1995 | Rosen | |
| 5,455,953 A | 10/1995 | Russell | |
| 5,457,746 A | 10/1995 | Dolphin | |
| 5,473,687 A | 12/1995 | Lipscomb et al. | |
| 5,473,692 A | 12/1995 | Davis | |
| 5,485,577 A | 1/1996 | Eyer et al. | |
| 5,499,298 A | 3/1996 | Narasimhalu et al. | |
| 5,502,766 A | 3/1996 | Boebert et al. | |
| 5,504,814 A | 4/1996 | Miyahara | |
| 5,504,816 A | 4/1996 | Hamilton et al. | |
| 5,504,818 A | 4/1996 | Okano | |
| 5,504,837 A | 4/1996 | Griffeth et al. | |
| 5,509,070 A | 4/1996 | Schull | |
| 5,530,235 A | 6/1996 | Stefik et al. | |
| 5,532,920 A | 7/1996 | Hartrick et al. | |
| 5,534,975 A | 7/1996 | Stefik et al. | |
| 5,535,276 A | 7/1996 | Ganesan | |
| 5,539,735 A | 7/1996 | Moskowitz | |
| 5,553,143 A | 9/1996 | Ross et al. | |
| 5,557,678 A | 9/1996 | Ganesan | |
| 5,563,946 A | 10/1996 | Cooper et al. | |
| 5,564,038 A | 10/1996 | Grantz et al. | |
| 5,568,552 A | 10/1996 | Davis | |
| 5,621,797 A | 4/1997 | Rosen | |
| 5,625,690 A | 4/1997 | Michel et al. | |
| 5,629,980 A | 5/1997 | Stefik et al. | |
| 5,633,932 A | 5/1997 | Davis et al. | |
| 5,634,012 A | 5/1997 | Stefik et al. | |
| 5,636,346 A | 6/1997 | Saxe | |
| 5,638,443 A | 6/1997 | Stefik et al. | |
| 5,638,513 A | 6/1997 | Ananda | |
| 5,649,013 A | 7/1997 | Stuckey et al. | |
| 5,655,077 A | 8/1997 | Jones et al. | |
| 5,671,412 A * | 9/1997 | Christiano | 707/104.1 |
| 5,708,709 A | 1/1998 | Rose | |
| 5,708,717 A | 1/1998 | Alasia | |
| 5,715,403 A | 2/1998 | Stefik | |
| 5,734,823 A | 3/1998 | Saigh et al. | |
| 5,734,891 A | 3/1998 | Saigh | |
| 5,737,413 A | 4/1998 | Akiyama et al. | |
| 5,737,416 A | 4/1998 | Cooper et al. | |
| 5,745,569 A | 4/1998 | Moskowitz et al. | |
| 5,745,879 A | 4/1998 | Wyman | |
| 5,748,783 A | 5/1998 | Rhoads | |
| 5,757,907 A | 5/1998 | Cooper et al. | |
| 5,761,686 A | 6/1998 | Bloomberg | |
| 5,764,807 A | 6/1998 | Pearlman et al. | |
| 5,765,152 A | 6/1998 | Erickson | |
| 5,768,426 A | 6/1998 | Rhoads | |
| 5,787,172 A | 7/1998 | Arnold | |
| 5,790,664 A * | 8/1998 | Coley et al. | 709/203 |
| 5,790,677 A | 8/1998 | Fox et al. | |
| 5,812,664 A | 9/1998 | Bernobich et al. | |
| 5,825,876 A | 10/1998 | Peterson | |
| 5,825,879 A | 10/1998 | Davis | |
| 5,825,892 A | 10/1998 | Braudaway et al. | |
| 5,838,792 A | 11/1998 | Ganesan | |
| 5,848,154 A | 12/1998 | Nishio et al. | |
| 5,848,378 A | 12/1998 | Shelton et al. | |
| 5,850,443 A | 12/1998 | Van Oorschot et al. | |
| 5,870,473 A | 2/1999 | Boesch et al. | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,861 A | 7/1999 | Hall et al. | |
| 5,925,127 A * | 7/1999 | Ahmad | 713/200 |

| | | | |
|---|---|---|---|
| 5,933,498 A | 8/1999 | Schneck et al. | |
| 5,940,504 A | 8/1999 | Griswold | |
| 5,943,422 A | 8/1999 | Van Wie et al. | |
| 5,949,876 A | 9/1999 | Ginter et al. | |
| 5,953,419 A | 9/1999 | Lohstroh et al. | |
| 5,982,891 A | 11/1999 | Ginter et al. | |
| 5,983,207 A | 11/1999 | Turk et al. | |
| 5,987,134 A | 11/1999 | Shin et al. | |
| 5,999,624 A | 12/1999 | Hopkins | |
| 5,999,949 A | 12/1999 | Crandall | |
| 6,006,332 A | 12/1999 | Rabne et al. | |
| 6,009,401 A * | 12/1999 | Horstmann | 705/1 |
| 6,020,882 A | 2/2000 | Kinghorn et al. | |
| 6,047,067 A | 4/2000 | Rosen | |
| 6,056,786 A * | 5/2000 | Rivera et al. | 717/168 |
| 6,073,234 A | 6/2000 | Kigo et al. | |
| 6,091,777 A | 7/2000 | Guetz et al. | |
| 6,112,181 A | 8/2000 | Shear et al. | |
| 6,112,239 A | 8/2000 | Kenner et al. | |
| 6,115,471 A | 9/2000 | Oki et al. | |
| 6,135,646 A | 10/2000 | Kahn et al. | |
| 6,138,119 A | 10/2000 | Hall et al. | |
| 6,141,754 A | 10/2000 | Choy | |
| 6,157,719 A | 12/2000 | Wasilewski et al. | |
| 6,157,721 A | 12/2000 | Shear et al. | |
| 6,169,976 B1 | 1/2001 | Colosso | |
| 6,185,683 B1 | 2/2001 | Ginter et al. | |
| 6,189,037 B1 | 2/2001 | Adams et al. | |
| 6,189,146 B1 * | 2/2001 | Misra et al. | 717/177 |
| 6,192,165 B1 | 2/2001 | Irons | |
| 6,209,092 B1 | 3/2001 | Linnartz | |
| 6,216,112 B1 | 4/2001 | Fuller et al. | |
| 6,219,652 B1 | 4/2001 | Carter et al. | |
| 6,226,618 B1 * | 5/2001 | Downs et al. | 705/51 |
| 6,233,684 B1 | 5/2001 | Stefik et al. | |
| 6,236,971 B1 | 5/2001 | Stefik et al. | |
| 6,237,786 B1 | 5/2001 | Ginter et al. | |
| 6,240,185 B1 | 5/2001 | Van Wie et al. | |
| 6,253,193 B1 | 6/2001 | Ginter et al. | |
| 6,292,569 B1 | 9/2001 | Shear et al. | |
| 6,301,660 B1 | 10/2001 | Benson | |
| 6,307,939 B1 | 10/2001 | Vigarie | |
| 6,314,408 B1 | 11/2001 | Salas et al. | |
| 6,327,652 B1 | 12/2001 | England et al. | |
| 6,330,670 B1 | 12/2001 | England et al. | |
| 6,345,256 B1 | 2/2002 | Milsted et al. | |
| 6,353,888 B1 | 3/2002 | Kakehi et al. | |
| 6,363,488 B1 | 3/2002 | Ginter et al. | |
| 6,385,596 B1 | 5/2002 | Wiser et al. | |
| 6,389,402 B1 | 5/2002 | Ginter et al. | |
| 6,397,333 B1 | 5/2002 | Söhne et al. | |
| 6,401,211 B1 | 6/2002 | Brezak, Jr. et al. | |
| 6,405,369 B1 | 6/2002 | Tsuria | |
| 6,424,717 B1 | 7/2002 | Pinder et al. | |
| 6,424,947 B1 | 7/2002 | Tsuria et al. | |
| 6,487,659 B1 | 11/2002 | Kigo et al. | |
| 6,516,052 B2 | 2/2003 | Voudouris | |
| 6,516,413 B1 | 2/2003 | Aratani et al. | |
| 6,523,745 B1 | 2/2003 | Tamori | |
| 6,574,609 B1 | 6/2003 | Downs | |
| 6,796,555 B1 | 9/2004 | Blahut | |
| 6,853,728 B1 | 2/2005 | Kahn et al. | |
| 7,080,139 B1 | 7/2006 | Briggs et al. | |
| 7,213,261 B1 | 5/2007 | Gomez et al. | |
| 7,240,359 B1 | 7/2007 | Sie et al. | |
| 7,467,212 B2 | 12/2008 | Adams et al. | |
| 7,484,246 B2 | 1/2009 | Matsuyama et al. | |
| 2001/0009026 A1 | 7/2001 | Terao et al. | |
| 2001/0011276 A1 | 8/2001 | Durst, Jr. et al. | |
| 2001/0014206 A1 | 8/2001 | Artigalas et al. | |
| 2001/0037467 A1 | 11/2001 | O'Toole, Jr. et al. | |
| 2001/0039659 A1 | 11/2001 | Simmons et al. | |
| 2001/0049824 A1 | 12/2001 | Baker et al. | |
| 2002/0001387 A1 | 1/2002 | Dillon | |
| 2002/0004779 A1 | 1/2002 | Turk et al. | |
| 2002/0035618 A1 | 3/2002 | Mendez et al. | |
| 2002/0044658 A1 | 4/2002 | Wasilewski et al. | |
| 2002/0049717 A1 | 4/2002 | Routtenberg et al. | |
| 2002/0051407 A1 | 5/2002 | Griner et al. | |
| 2002/0056118 A1 | 5/2002 | Hunter et al. | |
| 2002/0069282 A1 | 6/2002 | Reisman | |
| 2002/0083006 A1 | 6/2002 | Headings et al. | |
| 2002/0099948 A1 | 7/2002 | Kocher et al. | |
| 2002/0127423 A1 | 9/2002 | Kayanakis | |
| 2002/0154157 A1 | 10/2002 | Sherr et al. | |
| 2002/0161473 A1 | 10/2002 | Higuchi et al. | |
| 2002/0184158 A1 | 12/2002 | Tadayon et al. | |
| 2003/0023564 A1 | 1/2003 | Padhye et al. | |
| 2003/0097567 A1 | 5/2003 | Terao et al. | |
| 2004/0015437 A1 | 1/2004 | Choi et al. | |
| 2004/0024688 A1 | 2/2004 | Bi et al. | |
| 2004/0052370 A1 | 3/2004 | Katznelson | |
| 2004/0172552 A1 | 9/2004 | Boyles et al. | |
| 2007/0244812 A1 | 10/2007 | Turk et al. | |
| 2010/0106659 A1 | 4/2010 | Stefik et al. | |

FOREIGN PATENT DOCUMENTS

| | | |
|---|---|---|
| EP | 0 067 556 B1 | 12/1982 |
| EP | 0 084 441 | 7/1983 |
| EP | 0 180 460 | 5/1986 |
| EP | 0 257 585 A2 | 3/1988 |
| EP | 0 332 304 A2 | 9/1989 |
| EP | 0 332 707 | 9/1989 |
| EP | 0 393 806 A2 | 10/1990 |
| EP | 0 450 841 A2 | 10/1991 |
| EP | 0 529 261 A2 | 3/1993 |
| EP | 0 613 073 A1 | 8/1994 |
| EP | 0 651 554 | 5/1995 |
| EP | 0 668 695 | 8/1995 |
| EP | 0 678 836 A1 | 10/1995 |
| EP | 0 679 977 A1 | 11/1995 |
| EP | 0 715 243 A1 | 6/1996 |
| EP | 0 715 244 A1 | 6/1996 |
| EP | 0 715 245 A1 | 6/1996 |
| EP | 0 725 376 | 8/1996 |
| EP | 0 731 404 A1 | 9/1996 |
| EP | 0 763 936 A2 | 3/1997 |
| EP | 0 818 748 A2 | 1/1998 |
| EP | 0 840 194 A2 | 5/1998 |
| EP | 0 892 521 A2 | 1/1999 |
| EP | 0 934 765 A1 | 8/1999 |
| EP | 0 946 022 A2 | 9/1999 |
| EP | 0 964 572 A1 | 12/1999 |
| EP | 1 103 922 A2 | 5/2001 |
| GB | 1483282 | 8/1977 |
| GB | 2022969 A | 12/1979 |
| GB | 2 136 175 | 9/1984 |
| GB | 2 236 604 | 4/1991 |
| GB | 2236604 A | 4/1991 |
| GB | 2309364 A | 7/1997 |
| GB | 2316503 A | 2/1998 |
| GB | 2354102 A | 3/2001 |
| JP | 62-241061 | 10/1987 |
| JP | 64-068835 | 3/1989 |
| JP | 4180451 | 6/1992 |
| JP | H4-180451 | 6/1992 |
| JP | 04-369068 | 12/1992 |
| JP | 5-100939 | 4/1993 |
| JP | 5168039 A2 | 7/1993 |
| JP | 05-268415 | 10/1993 |
| JP | 06-175794 | 6/1994 |
| JP | 06-215010 | 8/1994 |
| JP | 7-36768 | 2/1995 |
| JP | 07-084852 | 3/1995 |
| JP | 07-200317 | 8/1995 |
| JP | 07-244639 | 9/1995 |
| JP | 0 715 241 | 6/1996 |
| JP | 11031130 A2 | 2/1999 |
| JP | 11032037 A2 | 2/1999 |
| JP | 11205306 A2 | 7/1999 |
| JP | 11215121 A2 | 8/1999 |
| JP | 2000215165 A2 | 8/2000 |
| JP | 20000-322352 | 11/2000 |
| JP | 2005218143 A2 | 8/2005 |
| JP | 2005253109 A2 | 9/2005 |
| JP | 2006180562 A2 | 7/2006 |
| WO | WO 83/04461 A1 | 12/1983 |
| WO | WO 92/20022 | 11/1992 |

| | | |
|---|---|---|
| WO | WO 92/20022 A1 | 11/1992 |
| WO | WO 93/01550 | 1/1993 |
| WO | WO 93/01550 A1 | 1/1993 |
| WO | WO 93/11480 A1 | 6/1993 |
| WO | WO 94/01821 | 1/1994 |
| WO | WO 94/03003 A1 | 2/1994 |
| WO | WO 96/13814 A1 | 5/1996 |
| WO | WO 96/24092 | 8/1996 |
| WO | WO 96/24092 A2 | 8/1996 |
| WO | WO 96/27155 A2 | 9/1996 |
| WO | WO 97/25800 A1 | 7/1997 |
| WO | WO 97/37492 A1 | 10/1997 |
| WO | WO 97/41661 A2 | 11/1997 |
| WO | WO 97/43761 A2 | 11/1997 |
| WO | WO 97/48203 | 12/1997 |
| WO | WO 98/09209 A1 | 3/1998 |
| WO | WO 98/10561 A1 | 3/1998 |
| WO | WO 98/11690 | 3/1998 |
| WO | WO 98/11690 A1 | 3/1998 |
| WO | WO 98/19431 A1 | 5/1998 |
| WO | WO 98/42098 | 9/1998 |
| WO | WO 98/43426 A1 | 10/1998 |
| WO | WO 98/45768 A1 | 10/1998 |
| WO | WO 99/24928 A2 | 5/1999 |
| WO | WO 99/34553 A1 | 7/1999 |
| WO | WO 99/35782 A1 | 7/1999 |
| WO | WO 99/48296 A1 | 9/1999 |
| WO | WO 99/49615 | 9/1999 |
| WO | WO 99/60461 | 11/1999 |
| WO | WO 99/60461 A1 | 11/1999 |
| WO | WO 99/60750 A2 | 11/1999 |
| WO | WO 00/04727 A2 | 1/2000 |
| WO | WO 00/05898 A2 | 2/2000 |
| WO | WO 00/46994 A1 | 8/2000 |
| WO | WO 00/59152 A2 | 10/2000 |
| WO | WO 00/62260 A1 | 10/2000 |
| WO | WO 00/72118 A | 11/2000 |
| WO | WO 00/72118 A1 | 11/2000 |
| WO | WO 00/73922 A2 | 12/2000 |
| WO | WO 01/03044 A1 | 1/2001 |
| WO | WO 01/09703 A1 | 2/2001 |
| WO | WO 01/37209 A1 | 5/2001 |
| WO | WO 01/63528 | 8/2001 |
| WO | WO 2004/034223 A2 | 4/2004 |
| WO | WO 2004/103843 | 12/2004 |

OTHER PUBLICATIONS

Blaze et al, "Atomic Proxy Cryptography" Draft (Online) (Nov. 2, 1997) XP002239619 Retrieved from the Internet.

No Author, "Capability- and Object-Based Systems Concepts," Capability-Based Computer Systems, pp. 1-19 (no date).

Cox, "Superdistribution" Wired Magazine (Sep. 1994) XP002233405 URL:http://www.wired.com/wired/archive/2.09/superdis_pr.html>.

Dunlop et al, Telecommunications Engineering, pp. 346-352 (1984).

Elgamal, "A Public Key Cryptosystem and a Signature Scheme Based on Discrete Logarithms," IEEE Transactions on Information Theory IT-31(4):469-472 (Jul. 1985).

Gheorghiu et al., "Authorization for Metacomputing Applications" (no date).

Iannella, ed., Open Digital Rights Language (ODRL), pp. 1-31 (Nov. 21, 2000).

Kahle, wais.concepts.txt, Wide Area Information Server Concepts, Thinking Machines Version 4, Draft, pp. 1-18 (Nov. 3, 1989).

Kahn, "Deposit, Registration and Recordation in an Electronic Copyright Management System," Technical Report, Corporation for National Research Initiatives, Reston, Virginia (Aug. 1992) URL:http://www.cni.org/docs/ima.ip-workshop/kahn.html.

Kahn et al, "The Digital Library Project, vol. 1: The World of Knowbots (Draft), An Open Architecture for a Digital Library System and a Plan for its Development," Corporation for National Research Initiatives, pp. 1-48 (Mar. 1988).

Kohl et al, Network Working Group Request for Comments: 1510, pp. 1-112 (Sep. 1993).

Lee et al, CDMA Systems Engineering Handbook (1998) [excerpts but not all pages numbered].

Mambo et al, "Protection of Data and Delegated Keys in Digital Distribution," Information Security and Privacy. Second Australian Conference, ACISP '97 Proceedings, pp. 271-282 (Sydney, NSW, Australia, Jul. 7-9, 1997, 1997 Berlin, Germany, Springer-Verlag, Germany), XP008016393 ISBN: 3-540-63232-8.

Mambo et al, "Proxy Cryptosystems: Delegation of the Power to Decrypt Ciphertexts,", IEICE Trans. Fundamentals vol. E80-A, No. 1:54-63 (Jan. 1997) XP00742245 ISSN: 0916-8508.

Microsoft Word, Users Guide, Version 6.0, pp. 487-489, 549-555, 560-564, 572-575, 599-613, 616-631 (1993).

Ojanperä and Prasad, eds., Wideband CDMA for Third Generation Mobile Communications (1998) [excerpts but not all pages numbered].

Perritt, "Knowbots, Permissions Headers and Contract Law," Paper for the Conference on Technological Strategies for Protecting Intellectual Property in the Networked Multimedia Environment, pp. 1-22 (Apr. 2-3, 1993 with revisions of Apr. 30, 1993).

Raggett, (Hewlett Packard), "HTML+(Hypertext markup language)," pp. 1-31 (Jul. 12, 1993) URL:http://citeseer.ist.psu.edu/correct/340709.

Samuelson et al, "Intellectual Property Rights for Digital Library and Hypertext Publishing Systems: an Analysis of Xanadu," Hypertext '91 Proceedings, pp. 39-50 (Dec. 1991).

No Author, "Sofdock Services Introduces . . . Softlock Services" Press Release (Jan. 28, 1994).

No Author, "Appendix III—Compatibility with HTML," No Title, pp. 30-31 (no date).

No Editor, No Title, Dictionary pages, pp. 469-472, 593-594 (no date).

Benoit, Digital Television MPEG-1, MPEG-2 and Principles of the DVB System, pp. 75-80, 116-121 (no date).

Benoit, Digital Television MPEG-1, MPEG-2 and Principles of the DVB System, $2^{nd}$ edition, pp. 74-80 (no date).

AH Digital Audio and Video Series, "DTV Receivers and Measurements," Understanding Digital Terrestrial Broadcasting, pp. 159-164 (no date).

O'Driscoll, The Essential Guide to Digital Set-Top Boxes and Interactive TV, pp. 6-24 (no date).

Ius Mentis, "The ElGamal Public Key System," pp. 1-2 (Oct. 1, 2005) online at http://www.iusmentis.com/technology/encyrption/elgamal/.

Schneier, "Crypto Bibliography," Index of Crypto Papers Available Online, pp. 1-2 (online) (no date).

No Author, no Title, pp. 344-355 (no date).

No Author, "Part Four Networks," No Title, pp. 639-714 (no date).

Microsoft Word User's Guide, pp. 773-774, 315-316, 487-489, 561-564, 744, 624-633 (1993).

No Author, "What is the ElGamal Cryptosystem," p. 1 (Nov. 27, 2006) online at http://www.x5.net/faqs/crypto/q29.html.

Johnson et al., "A Secure Distributed Capability Based System," ACM, pp. 392-402 (1985).

Wikipedia, "El Gamal Encyption," pp. 1-3 (last modified Nov. 2, 2006) online at http://en.wikipedia.org/wiki/ElGamal_encryption.

Blaze, "Atomic Proxy Cryptography," p. 1 Abstract (Oct. 20, 1998).

Blaze, "Matt Blaze's Technical Papers," pp. 1-6 (last updated Aug. 6, 2006)].

Online Search Results for "inverted file", "inverted index" from www.techweb.com, www.cryer.co.uk, computing-dictionary.thefreedictionary.com, www.nist.gov, en.wikipedia.org, www.cni.org, www.tiscali.co.uk (Jul. 15-16, 2006).

Corporation for National Research Initiatives, "Digital Object Architecture Project", http://www.nnri.reston.va.us/doa.html (updated Nov. 28, 2006).

Stefik, Summary and Analysis of A13 (Kahn, Robert E and Vinton G Cerf, "The Digital Library Project, vol. 1: The World of Knowbots (Draft), An Open Architecture for a Digital Library System and a Plan for its Development," Corporation for National Research Initiatives (Mar. 1988)), pp. 1-25 (May 30, 2007).

PCT International Search Report for PCT/US02/15201 dated Feb. 13, 2003 (3 pages).

European Search Report dated Jun. 11, 2004.

"National Semiconductor and EPR Partner for Information Metering/Data Security Cards" Mar. 4, 1994, Press Release from Electronic Publishing Resources, Inc.

Weber, R., "Digital Rights Management Technology" Oct. 1995.

Flasche, U. et al., "Decentralized Processing of Documents", pp. 119-131, 1986, Comput. & Graphics, vol. 10, No. 2.

Mori, R. et al., "Superdistribution: The Concept and the Architecture", pp. 1133-1146, 1990, The Transactions of the IEICE, vol. E 73, No. 7, Tokyo, JP.

Weber, R., "Metering Technologies for Digital Intellectual Property", pp. 1-29, Oct. 1994, A Report to the International Federation of Reproduction Rights Organizations.

Clark, P.C. et al., "Bits: A Smartcard protected Operating System", pp. 66-70 and 94, Nov. 1994 Communications of the ACM, vol. 37, No. 11.

Ross, P.E., "Data Guard", pp. 101, Jun. 6, 1994, Forbes.

Saigh, W.K., "Knowledge is Sacred", 1992, Video Pocket/Page Reader Systems, Ltd.

Kahn, R.E., "Deposit, Registration and Recordation in an Electronic Copyright Management System", pp. 1-19, Aug. 1992, Corporation for National Research Initiatives, Virginia.

Hilts, P. et al., "Books While U Wait", pp. 48-50, Jan. 3, 1994, Publishers Weekly.

Strattner, A, "Cash Register on a Chip may Revolutionize Software Pricing and Distribution; Wave Systems Corp.", pp. 62, Apr. 1994, Computer Shopper, vol. 14, No. 4, ISSN 0886-0556.

O'Conner, M., "New Distribution Option for Electronic Publishers; iOpener Data Encryption and Metering System for CD-ROM use; Column", pp. 134, Mar. 1994, CD-ROM Professional, vol. 7, No. 2, ISSN: 1409-0833.

Willett, S., "Metered PCs: Is Your System Watching You? Wave System beta tests new technology", pp. 84, May 2, 1994, InfoWorld.

Linn, R., "Copyright and Information Services in the Context of the National Research and Education Network", pp. 9-20, Jan. 1994, IMA Intellectual Property Project Proceedings, vol. 1, Issue 1.

Perrit, Jr., H., "Permission Headers and Contract Law", pp. 27-48, Jan. 1994, IMA Intellectual Property Project Proceedings, vol. 1, Issue 1.

Upthegrove, L., "Intellectual Property Header Descriptors: A Dynamic Approach", pp. 63-66, Jan. 1994, IMA Intellectual Property Proceedings, vol. 1, Issue 1.

Sirbu, M., "Internet Billing Service Design and prototype Implementation", pp. 67-80, Jan. 1994, IMA Intellectual Property Project Proceedings, vol. 1, Issue 1.

Simmel, S. et al., "Metering and Licensing of Resources: Kala's General Purpose Approach", pp. 81-110, Jan. 1994, IMA Intellectual Property Project Proceedings, vol. 1, Issue 1.

Kahn, R., "Deposit, Registration and Recordation in an Electronic Copyright Management System", pp. 111-120, Jan. 1994, IMA Intellectual Property Project Proceedings, vol. 1, Issue 1.

Tygar, J. et al., "Dyad: A System for Using Physically Secure Coprocessors", pp. 121-152, Jan. 1994, IMA Intellectual Property Project Proceedings, vol. 1, Issue 1.

Griswold, G., "A Method for Protecting Copyright on Networks", pp. 169-178, Jan. 1994, IMA Intellectual Property Project Proceedings, vol. 1, Issue 1.

Nelson, T., "A Publishing and Royalty Model for Networked Documents", pp. 257-259, Jan. 1994, IMA Intellectual Property Project Proceedings, vol. 1, Issue 1.

Robinson, E., "Redefining Mobile Computing", pp. 238-240, 247-248 and 252, Jul. 1993, PC Computing.

Abadi, M. et al., "Authentication and Delegation with Smart-cards", 1990, Research Report DEC Systems Research Center.

Mark Stefik, "Letting Loose the Light: Igniting Commerce in Electronic Publication", pp. 219-253, 1996, Internet Dreams: Archetypes, Myths, and Metaphors, IDSN 0-262-19373-6.

Mark Stefik, "Letting Loose the Light: Igniting Commerce in Electronic Publication", pp. 2-35, Feb. 8, 1995, Internet Dreams: Archetypes, Myths and Metaphors.

Perritt, "Technologies Strategies for Protecting IP in the Networked Multimedia Environment", Apr. 2-3, 1993, Knowbot Permissions.

Delaigle, "Digital Watermarking", Spie Conference in Optical Security and Counterfeit Deterrence Techniques, San Jose, CA Feb. 1996, vol. 2659 pp. 99-110.

Henry H. Perritt, Jr., "Technological Strategies for Protecting Intellectual Property in the Networked Multmedia Enviroment", Apr. 2-3, 1993, Knowbots, Permissions Headers & Contract Law.

Delaigle, "Digital Watermarking," Spie Conference in Optical Security and Counterfeit Deterrence Techniques, San Jose, CA (Feb. 1996).

Perritt, "Technologies Strategies for Protecting Intellectual Property in the Networked Multimedia Environment," Knowbots, Permissions Headers and Contract Law (Apr. 2-3, 1993).

International Search Report issued in corresponding Application No. PCT/US05/00337 mailed Aug. 24, 2007.

PCT International Search Report for PCT/US02/17851 dated Oct. 3, 2002 (5 pages).

Motoike, Sachiko, "Content Distribution Service Using DVD-ROM", Matsushita Technical Journal, Japan, Oct. 18, 1998, vol. 44, No. 5, pp. 25-33.

Lampson et al., Authentication in Distributed Systems: Theory and Practice, ACM, 1992, pp. 1-47.

* cited by examiner

METHOD AND SYSTEM FOR SUBSCRIPTION DIGITAL RIGHTS MANAGEMENT

RELATED APPLICATION DATA

This application claims benefit from U.S. provisional application Ser. No. 60/296,114 filed on Jun. 7, 2001, the disclosure of which is incorporated herein by reference. This application is a Continuation-in-Part of copending application Ser. No. 09/867,747 filed on May 31, 2001, the disclosure of which is incorporate herein by reference.

BACKGROUND OF THE INVENTION

1. Field of the Invention

The present invention is directed to a subscription digital rights management system and a method thereof. In particular, the present invention is directed to such a system and method that facilitates subscription to plural protected items, such as digital content.

2. Description of Related Art

One of the most important issues impeding the widespread distribution of digital works (i.e. documents or other content in forms readable by computers), via electronic means, and the Internet in particular, is the current lack of ability to enforce the intellectual property rights of content owners during the distribution and use of digital works. Efforts to resolve this problem have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM"), collectively referred to as "Digital Rights Management (DRM)" herein. There are a number of issues to be considered in effecting a DRM System. For example, authentication, authorization, accounting, payment and financial clearing, rights specification, rights verification, rights enforcement, and document protection issues should be addressed. U.S. Pat. Nos. 5,530,235, 5,634,012, 5,715,403, 5,638,443, and 5,629,980, the disclosures of which are incorporated herein by reference disclose DRM systems addressing these issues.

In the world of printed documents and other physical content, a work created by an author is usually provided to a publisher, which formats and prints numerous copies of the work. The copies are then sent by a distributor to bookstores or other retail outlets, from which the copies are purchased by end users. While the low quality of copying and the high cost of distributing printed material have served as deterrents to unauthorized copying of most printed documents, it is far too easy to copy, modify, and redistribute unprotected digital works with high quality. Accordingly, mechanisms of protecting digital works are necessary to retain rights of the owner of the work.

Unfortunately, it has been widely recognized that it is difficult to prevent, or even deter, people from making unauthorized copies of electronic works within current general-purpose computing and communications systems such as personal computers, workstations, and other devices connected over communications networks, such as local area networks (LANs), intranets, and the Internet. Many attempts to provide hardware-based solutions to prevent unauthorized copying have proven to be unsuccessful. The proliferation of high band-width "broadband" communications technologies and the development of what is presently known as the "National Information Infrastructure" (NII) will render it even more convenient to distribute large documents electronically, including video files such as full length motion pictures, and thus will remove any remaining deterrents to unauthorized copying and distribution of digital works. Accordingly, DRM technologies are becoming a high priority.

Two basic DRM schemes have been employed, secure containers and trusted systems. A "secure container" (or simply an encrypted document) offers a way to keep document contents encrypted until a set of authorization conditions are met and some copyright terms are honored (e.g., payment for use). After the various conditions and terms are verified with the document provider, the document is released to the user in clear form. Commercial products such as CRYPTOLOPES™ and DIGIBOXES™ fall into this category. Clearly, the secure container approach provides a solution to protecting the document during delivery over insecure channels, but does not provide any mechanism to prevent legitimate users from obtaining the clear document and then using and redistributing it in violation of content owners' intellectual property.

In the "trusted system" approach, the entire system is responsible for preventing unauthorized use and distribution of the document. Building a trusted system usually entails introducing new hardware such as a secure processor, secure storage and secure rendering devices. This also requires that all software applications that run on trusted systems be certified to be trusted. While building tamper-proof trusted systems is a real challenge to existing technologies, current market trends suggest that open and untrusted systems, such as PC's and workstations using browsers to access the Web, will be the dominant systems used to access digital works. In this sense, existing computing environments such as PC's and workstations equipped with popular operating systems (e.g., Windows™, Linux™, and UNIX) and rendering applications, such as browsers, are not trusted systems and cannot be made trusted without significantly altering their architectures. Of course, alteration of the architecture defeats a primary purpose of the Web, i.e. flexibility and compatibility.

U.S. Pat. No. 5,634,012, the disclosure of which is incorporated herein by reference, discloses a system for controlling the distribution of digital documents. Each rendering device has a repository associated therewith. A predetermined set of usage transaction steps define a protocol used by the repositories for enforcing usage rights associated with a document. Usage rights persist with the document content. The usage rights can permit various manners of use such as, viewing only, use once, distribution, and the like. Usage rights can be contingent on payment or other conditions.

Conventional DRM systems typically provide access to protected content after a transaction in which an end user obtains a license allowing access to the protected content. Thus, conventional DRM systems utilize a "per-transaction" model where each access to the protected content requires a separate transaction with a separate license. In this regard, conventional DRM systems can become very cumbersome when a user expects to access a large number of items of protected content since a transaction must be made for each item accessed.

SUMMARY OF THE INVENTION

A first aspect of the invention is a DRM system for distributing items having usage rights associated therewith in accordance with one embodiment of the present invention comprising an activation device adapted to issue a software package that enforces usage rights to control use of the items, the software package having a public and private key pair, the public key being associated with a user, a license device adapted to issue a license having usage rights associated with at least one item, a usage device adapted to receive the software package, receive the license associated with the at least one item, and allow the user to access the at least one item in accordance with the license, and a subscription managing device adapted to maintain a subscription list including the public key associated with the user, where the license is issued by the license device upon verifying presence of the public key in the subscription list.

A second aspect of the present invention is a method for distributing items having usage rights associated therewith, the method comprising the steps of providing a software package to at least one user, the software package enforcing usage rights to control use of the items and having a private key and a public key associated with the at least one user, storing the public key associated with the at least one user in a subscription list, receiving a request from the at least one user to access the at least one item, verifying that the at least one user requesting access to the at least one item is listed in the subscription list, and issuing a license that grants usage rights to the at least one user to use the at least one item.

DETAILED DESCRIPTION OF THE PREFERRED EMBODIMENT

Figure 1:
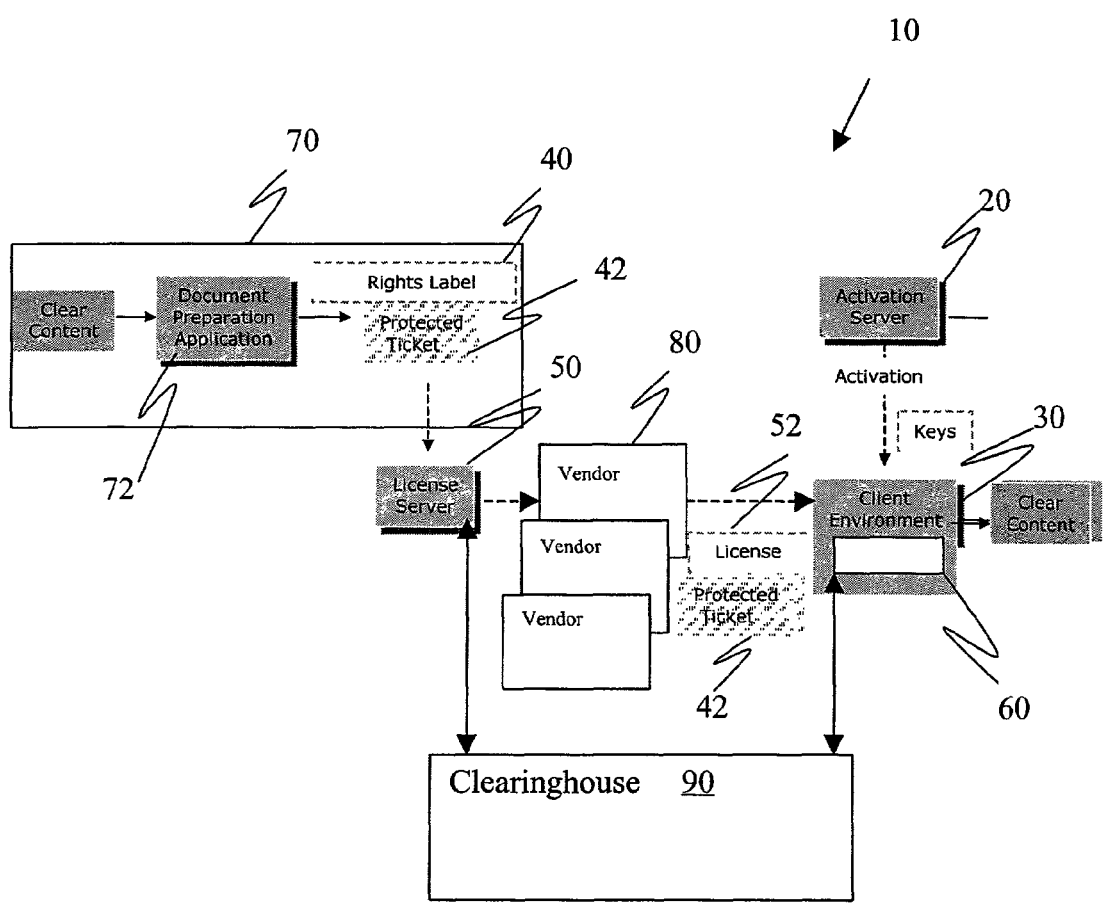
FIG. 1 is a schematic illustration of a DRM system adapted to a per-transaction model.

A DRM System can be utilized to specify and enforce usage rights for items, such as digital content, services, or goods property. FIG. 1 illustrates DRM system 10 that can be used to distribute digital content. DRM System 10 includes a user activation component, in the form of activation server 20, that issues public and private key pairs to content users in a protected fashion, as is well known.

Typically, when a user uses DRM System 10 for the first time, the user is activated. During an activation process, some information is exchanged between activation server 20 and a device associated with the user, such as client environment 30, and client component 60 is downloaded and installed in client environment 30. Client component 60 preferably is tamper resistant and contains the set of public and private keys issued by activation server 20 as well as other components such as any necessary engine for parsing or rendering protected items such as protected content 42.

Rights label 40 is associated with protected content 42 and specifies usage rights that are available to an end-user when corresponding conditions are satisfied. Protected content 42 specifies a specific item as described below. License server 50 manages the encryption keys and issues licenses 52 for exercise of rights in the manner set forth below. Licenses 52 embody the actual granting of rights to an end user. For example, license 52 may permit a user to view protected content 42 for a fee of five dollars. Client component 60 interprets and enforces the rights that have been specified in license 52.

Figure 2:
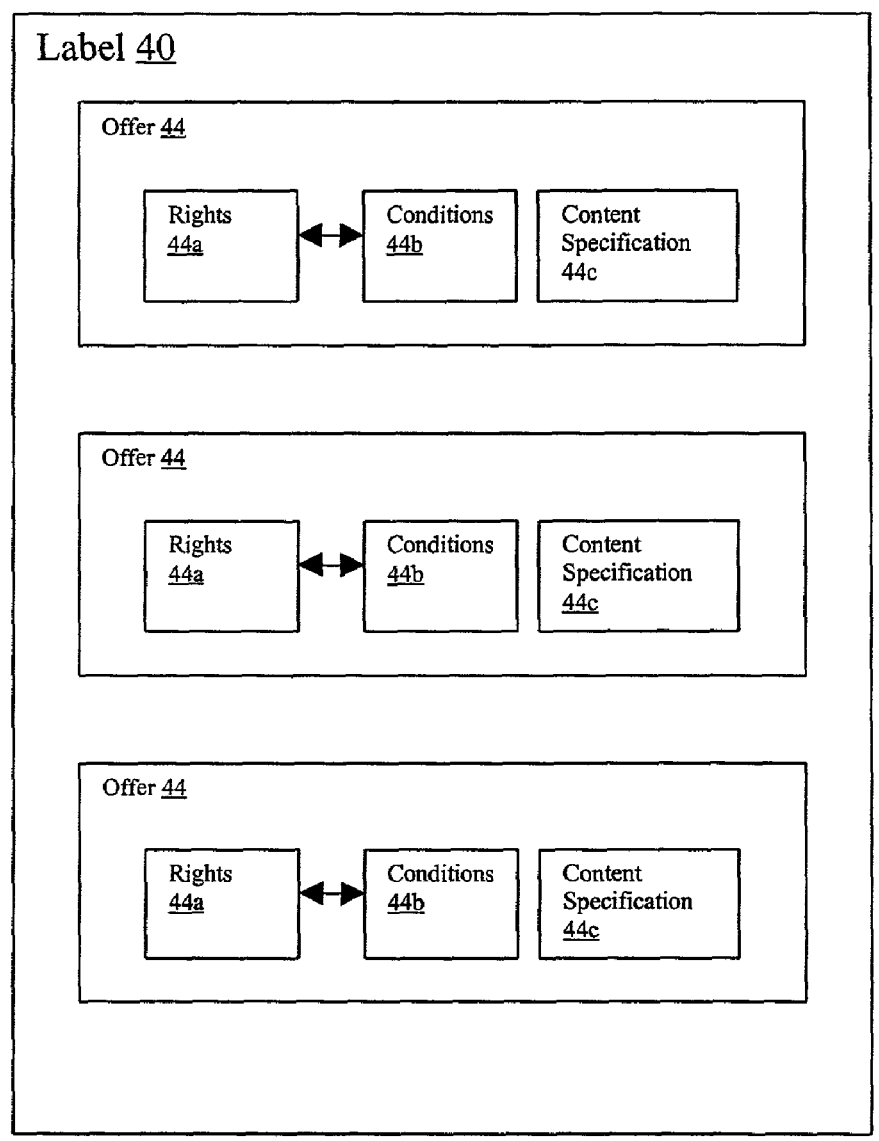
FIG. 2 is a schematic illustration of a rights label of the preferred embodiment.

FIG. 2 illustrates rights label 40 in accordance with the preferred embodiment. Rights label 40 includes plural rights offers 44. Each rights offer 44 includes usage rights 44a, conditions 44b, and content specification 44c. Content specification 44c can include any mechanism for referencing, calling, locating, or otherwise specifying content 42 associated with rights offer 44.

Figure 3:
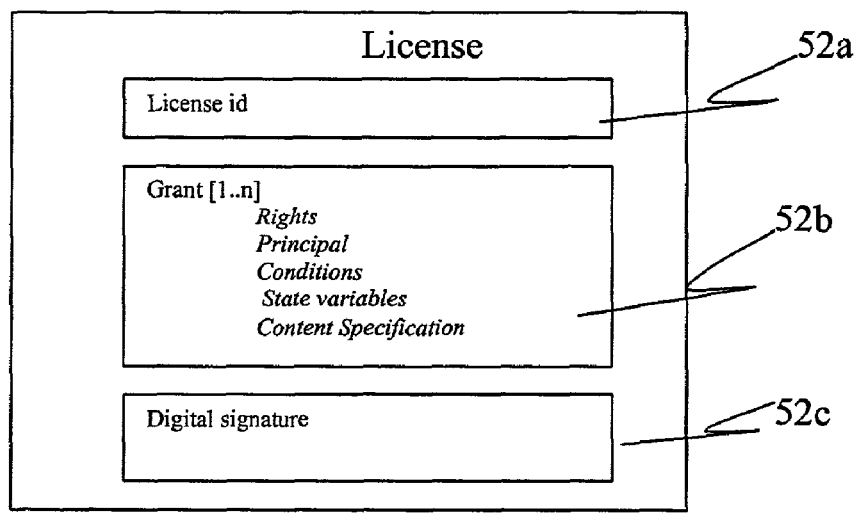
FIG. 3 is a schematic illustration of a license of the preferred embodiment.

FIG. 3 illustrates license 52 in accordance with the preferred embodiment. License 52 includes a unique license ID 52a, grant 52b (including usage rights, a principal, conditions, and state variables) and a content specification designating content 42 associated with license 52. License 52 also includes digital signature 52c including any cryptographic keys or the like for unlocking item ticket 42.

Usage rights specify manners of use. For example, a manner of use can include the ability to use an item in a specified way such as to print, copy, view, or the like. Rights can also be bundled. Further, usage rights can specify transfer rights, such as distribution rights. In some cases conditions must be satisfied in order to exercise the manner of use in a specified usage right. For, example a condition may be the payment of a fee, submission of personal data, or any other requirement desired before permitting exercise of a manner of use. Conditions can also be "access conditions" for example, access conditions can apply to a particular group of users, say students in a university, or members of a book club. In other words, the condition is that the user is a particular person or member of a particular group. Rights and conditions can exist as separate entities or can be combined.

State variables track potentially dynamic states conditions. State variables are variables having values that represent status of an item, usage rights, license or other dynamic conditions. State variables can be tracked, by clearinghouse 90 or another device, based on identification mechanisms in license 52 and ticket 42. Further, the value of state variables can be used in a condition. For example, a usage right can be the right to redeem item ticket 42 for specified goods and a condition can be that the usage right can be exercised three times. Each time the usage right is exercised, the value of the state variable is incremented. In this example, when the value of the state variable is three, the condition is not longer satisfied and ticket 42 cannot be redeemed. Another example of a state variable is time. A condition of license 52 may require that item ticket 42 is redeemed within thirty days. A state variable can be used to track the expiration of thirty days. Further, the state of a usage right can be tracked as a collection of state variables. The collection of the change is the state of a usage right represents the usage history of that right.

Protected content 42 can be prepared with document preparation application 72 installed on computer 70 associated with the distributor of content, a content service provider, or any other party. Preparation of protected content 42 consists of specifying the rights and conditions under which protected content 42 can be used by associating rights label 40 with protected content 42 and protecting protected content 42 with some crypto algorithm or other mechanism for preventing processing or rendering of protected content 42. A rights language such as XrML™ can be used to specify the rights and conditions in rights label 40. However, the rights and conditions can be specified in any manner. Accordingly, the process of specifying rights refers to any process for associating rights with protected content 42. Rights label 40 associated with protected content 42 and the encryption key used to encrypt protected content 42 can be transmitted to license server 50. Protected content 42 can be a text file an audio file, a video file, a digital multimedia file, or any other digital content.

A typical workflow for DRM System 10 is described below. A user operating within client environment 30 is activated for receiving protected content 42 by activation server 20. This results in a public-private key pair (and possibly some user/machine specific information) being downloaded to client environment 30 in the form of client software component 60 in a known manner. This activation process can be accomplished at any time prior to the issuing of a license.

When a user wishes to obtain a specific protected content 42, the user makes a request for the protected content 42. For example, a user might browse a Web site running on Web server of vendor 80, using a browser installed in client environment 30, and request an item corresponding to protected content 42. The user can examine rights offers 44 in rights label 40 associated with protected content 42 and select the desired usage rights. During this process, the user may go through a series of steps possibly to satisfy conditions of the usage rights including a fee transaction or other transactions (such as collection of information). When the appropriate conditions and other prerequisites, such as the collection of a fee and verification that the user has been activated, are satisfied, vendor 80 contacts license server 50 through a secure communications channel, such as a channel using a Secure Sockets Layer (SSL). License server 50 then generates license 52 for protected content 42 and vendor 80 causes both protected content 42 and license 52 to be downloaded. License 52 includes the usage rights selected and can be downloaded from license server 50 or an associated device. Protected content 42 can be downloaded from computer 70 associated with a vendor, distributor, or other party.

Client component 60 in client environment 30 will then proceed to interpret license 52 and allow the use of protected content 42 based on the rights and conditions specified in license 52. The interpretation and enforcement of usage rights and related systems and techniques are well known. The steps above may take place sequentially or approximately simultaneously or in various sequential order.

DRM System 10 addresses security aspects of protected contents 42. In particular, DRM System 10 may authenticate license 52 that has been issued by license server 50. One way to accomplish such authentication is for application 60 to determine if licenses 52 can be trusted. In other words, application 60 has the capability to verify and validate the cryptographic signature, or other identifying characteristic of license 52. Of course, the example above is merely one way to effect a DRM System. For example, license 52 and protected content 42 can be distributed from different entities. Clearinghouse 90 can be used to process payment transactions and verify payment prior to issuing a license.

DRM systems such as the one described above provide access to protected items, such as protected content, after activation in which an end user obtains software and a license to access the protected content. A license is issued, and thus an exchange of keys or other identifying mechanisms must be accomplished, for each item of protected content. This per-transaction model can become cumbersome when a user expects to access and use a large number of items of protected content since a license must be generated for each protected content. In contrast, the DRM system and method in accordance with the preferred embodiment is implemented using a subscription model to provide automated user access to a collection of protected content without necessitating activation of a license for each protected content accessed.

It should be initially noted that the term "subscription" is used in a generic sense and includes any item, such as protected content, that a user is allowed to access. The subscription could involve delivery of an electronic document, or delivery of a means to obtain a hard copy document or other goods or services. For example, subscriptions may be periodicals, monthly bills or banks statements or access to a streaming media service. Subscription may also be subscriptions to tickets or other vouchers which are used to access or obtain other content, resources, physical goods or service.

In addition, it should be understood that whereas terms "server" and "client" are used below to describe the devices for implementing the present invention in the embodiment discussed herein, these terms should be broadly understood to mean any appropriate device for executing the function described. For instance, a personal computer, laptop, PDA or other hand held device, PDAs, or any other general purpose programmable computer, or combination of such devices, such as a network of computers may be used.

Figure 4:
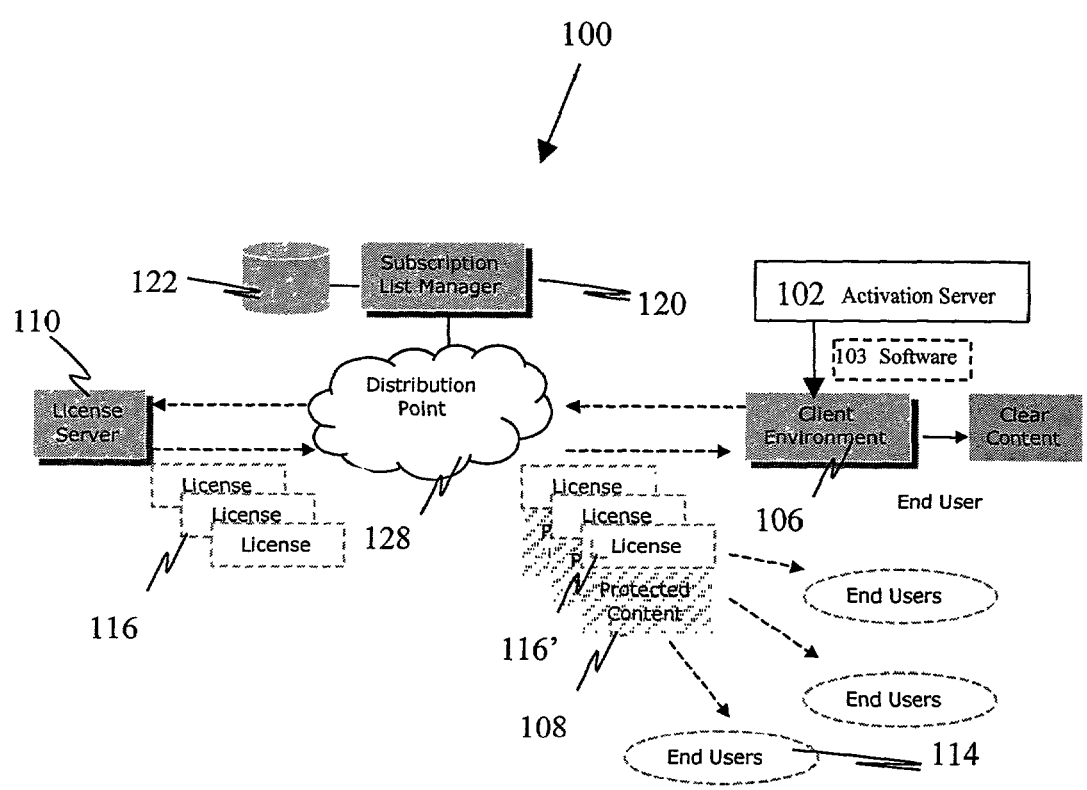
FIG. 4 is a schematic illustration of a DRM system in accordance with an embodiment of the present invention that provides subscription access to protected content.

DRM system 100 in accordance with an embodiment of present invention is illustrated in FIG. 4. DRM system 100 that allows subscription based use of items, such as protected content 108. Because items of protected content 108 are encrypted or otherwise protected, they cannot be used by end users 114 without licenses 116 and software package 103 as a security component. DRM system 100 includes an activation device such as activation server 102 that is adapted to issue software package 103 to a usage device such as client 106 to allow one or more end users 114 to use a plurality of items of protected content 108. Activation server 102 of the DRM system 100 provides a public and private key pair to client 106, each of the end users 114 having at least a public key associated therewith.

DRM system 100 also includes a license device, such as license server 110, that is adapted to issue licenses 116 having usage rights which are associated with plurality of protected content 108. These licenses 116 define the end user's rights regarding a particular item of protected content 108. Requests for licenses 116 from license server 110 are made by distribution point 128 based on requests of end users 114 via client 106. A separate client device can be associate with each end user 114 or end users 114 can use a common client device. License 116 allows authorized end users 114 to access and use protected content 103. When license server 110 issues requested licenses 116', distribution point 128 pre-packages licenses 116' with the appropriate protected content 108 so that licenses 116' are matched to protected content 108 as shown in FIG. 4. When pre-packaged, licenses 116' can be a part of protected content 108 in the manner shown in FIG. 4. However, licenses 116' may also be a separate file or other component with a mechanism to associate the license to the appropriate protected content. For example, a link, a reference, a call or other association mechanism can be used. Client 106 receives software 103 package from activation server 102, receives protected content 108 with license 116' associated thereto in a pre-packaged form from distribution point 128, and allows one or more end users 114 to access protected content 108 for which the end user is authorized.

In the subscription based implementation, DRM system 100 allows end users 114 to access a plurality of protected content 108 without necessitating a separate activation for each item of protected content. In particular, DRM system 100 is adapted to be operated in subscription based manner and to provide subscribing end users 114 access to a plurality of items of protected content 108 without requiring further activations by activation server 102 and the corresponding delay and overhead.

DRM system 100 of the present embodiment is provided with a subscription managing device such as subscription list manager 120 that is adapted to recognize the identity of each end user 114 by maintaining a subscription list of public keys associated to each of subscribing end user 114. Subscription list manager 120 of the illustrated embodiment is also provided with database 122 for storing such identity information and public key information associated with end users 114. By having a subscription list and comparing the utilized public key with the public keys in the subscription list, DRM system 100 knows the identity of the subscribing end users 114 seeking to access and use specific protected content. When distribution point 128 requests a license on behalf of a particular end user who is a subscriber, the public key associated with the particular end user is extracted from the stored list in database 122 by subscription list manager 120 and the public key is used by license server 110 to issue the requisite license.

Figure 5:
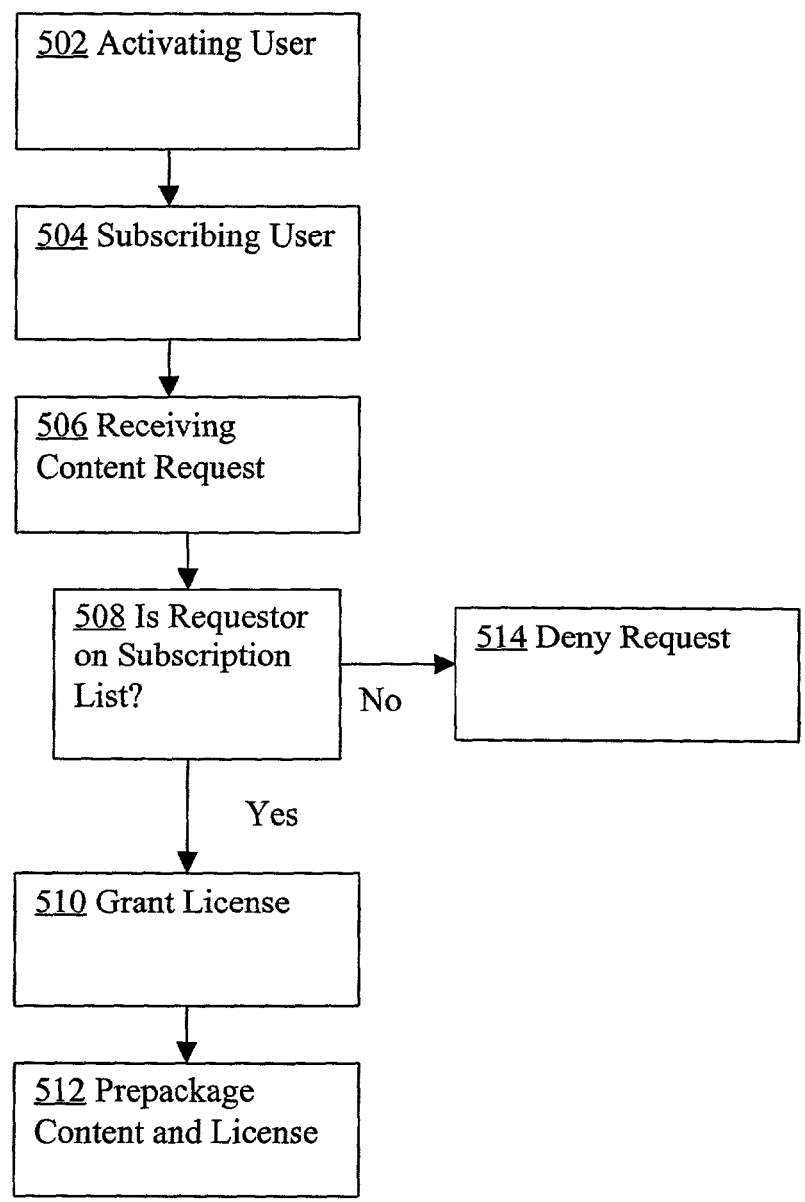
FIG. 5 is a flow chart of a method of the preferred embodiment.

In the illustrated embodiment of FIG. 4, DRM system 100 would be used in the following manner to affect the method illustrated in FIG. 5. First, end users 114 utilize client environment 106 to be activated by server 102 in the manner described above (step 502). End users 114 join a subscription that is offered through a distribution point 128 which can be implemented as an application through a web site, an online store, or in another appropriate manner in step 504. During the process of joining a subscription, a series of steps may be provided to create an account or arrange payment of a fee in any appropriate manner. The details of the creation of the account or payment of the fee can be accomplished using known user interfaces and known APIs, or the likes and thus, is not discussed in further detail herein.

After receiving a request for content in step 506, distribution point 128 retrieves the public keys that are associated with each end user 114, requesting protected content 108, the public keys being obtained during the activation process from activation server 102. The public keys identify end users and are stored in database 122 in correspondence with the associated end user and other associated data. When protected content 108 is to be distributed to subscribing end users 114, for instance through e-mail, distribution point 128 makes requests to license server 110 to issue the appropriate licenses. Requests for licenses may include a list of end users, their respective public encryption keys, and the protected content ID for which the licenses are to be issued. Of course, the request could also be for licensing a single end user or multiple protected content as well. The request for licenses may be executed using an API or by any other appropriate protocol.

License server 110 then authenticates the requester such as distribution point 128, checks that the end users are on the appropriate subscription list (step 508), and if so, issues licenses 116 (step 510), and delivers them to distribution point 128 for pre-packaging with protected content 108. The distribution point 128 pre-packages protected content 108 with licenses 116' and delivers them, or otherwise makes them available, to each end user 114 (step 512). Since items of protected content 108 are delivered pre-packaged with an issued license 116, users would not need to go through additional activations/procedures and wait for licenses to issue in order to access and use protected content 108 of the subscription after the initial activation. Subscription lists are maintained by subscription list manger 120 and correlated to the public keys, to verify if the user is entitled to license 116.

As noted above, it is desirable to pre-package license 116' with content 108 when it is delivered by distribution point 128 to end users 114 in order to provide a more seamless user experience. In the illustrated embodiment of FIG. 4, distribution point 128, which is merely schematically shown, may be a computer application or a storefront such as a web based, on-line store or vendor. Alternatively, distribution point 128 may be a computer application that is integrated with a mail server, license server 110, or subscription list manager 120 that maintains a subscription list. In such embodiments, maintenance of the subscription list could be as simple as storing the public keys in database 122, within a mail server directory, or a link to another storage location where public keys can be stored and managed. In an enterprise such as a group, company or entity, distribution lists may be adapted to be subscription lists. Any number of subscription lists can be managed.

In the above described manner, DRM system 100 facilitates end users access to large number of items of protected content without the need for repeated activations for each license. It should also be noted that the above discussed sequence of steps illustrate only one example workflow of how a DRM system in accordance with the present invention may be operated, one or more of the steps may take place in a different order, or approximately simultaneously.

In an embodiment where distribution point 128 is an application within a mail server, distribution point 128 may be operated to intercept incoming protected content to protect its access, and to make a request to license server 110 for a license for one or more end users 114 who are subscribers. Distribution point 128 may then pre-package the protected content and provide the pre-packaged content to the mail server workflow so that the mail server can route the protected content to the end users.

In an embodiment where distribution point 128 is integrated with subscriber list manager 120, public keys associated with end users 114 and maintained as a list of end user's identities are typically, but not necessarily, uploaded from client 106 during the activation process with activation server 102. In addition, in an enterprise, subscription list manager 120 may be integrated with a directory services system or similar system. The list of end users may also include a list of content that each of the end users subscribe to, in addition to the identity information and public keys.

Moreover, access to protected content may be through a pull model where end users pro-actively seek and use protected content such as by downloading protected content from a web site. Alternatively, access to protected content may be through a push model where end users receive protected content through e-mail, e-mail attachment, or by other mechanism.

A significant advantage of DRM system 100 is that it allows automation of the end user's access to a collection of protected content when the end user becomes a member of a designated subscription group for a particular subscription. Various end users can subscribe and unsubscribe and the subscription list may be managed by the end users themselves, or managed by another person or automated management system. Automation of the end user's access also allows the process for obtaining of a license for accessing particular protected content to be made transparent to the end user. For example, in the pull model, an end user may make downloads or otherwise access plurality of protected content without additional transaction steps to obtain required software or licenses for each of the protected content accessed after the initial activation. In the push model, the end user receives the protected content through e-mail, e-mail attachment, or by another mechanism which can be opened without any additional transaction steps after the initial activation.

It should be noted that actual delivery of the license and/or the protected content may be performed in various ways, for instance, by specialized systems such as delivery engines. Delivery engines are specialized and highly efficient entities that deliver content to a large population. For example, delivery engines may be used by a brokerage firm to deliver stock transaction confirmations by outsourcing this task to a company that specializes in low cost delivery of such documents.

Examples of specific types of subscriptions may be provided for use with the preferred embodiment are "subscribe-and-rent" subscriptions, and "subscribe-and-acquire" subscriptions. In subscribe-and-rent subscriptions, an end user is only allowed to access protected content while being an active subscriber, or based on some other condition, for example, a time period, a number of views, or until the next version of the content is made available. One example of a subscribe-and-rent subscription type is for online use of streaming media. Typically, protected content would be used on-line and once the subscription expires or a period of time lapses, the protected content, including previously accessible content, as well as unaccessed content is no longer made available to the end user. In this type of subscription usage rights, conditions, and state variables can be used to limit the manner of use in a known manner.

In subscribe-and-acquire subscriptions, end users actually acquire protected content. For instance, a certain amount or type of protected content could be acquired from a larger collection comprising a plurality of protected content. In addition, there could be preferential pricing, access, or terms can be given to a subscribing and user. In subscribe-and-acquire subscriptions, once the protected content is legitimately acquired, an end user would have the right to use it indefinitely and expiration of the subscription does not generally terminate the right to use content previously acquired. Business documents such as stock transaction confirmations are a typical example of a protected document appropriate for subscribe-and-acquire subscription.

Of course, in other implementations, both subscription types can be combined. For example, a subscribing end user may be offered a package that includes on-line access to all protected content and a predetermined number of downloads. In a music application, a subscribing end user may have on-line access to the entire catalog of music titles, but only be allowed to download one hundred titles. Of course, other permutations and subscription models are possible in implementing a subscription based DRM system and method. For instance, in another example, a subscription based DRM system and method would allow rights to a specific number, for example one hundred, downloads to be deferred, accumulated, or transferred to another person, or even returned to the subscription provider. Also, for example, acquisition could be made to persist only for the duration of certain conditions and does not literally have to be for an indefinite period.

In addition, different subscription models may be apply to different parts of the protected content. For example, a periodical may be acquired on a subscribe-and-acquire basis, but images that are part of the periodical may be acquired on a subscribe-and-rent basis and thus might expire or require additional fees for example. The license associated with the particular protected content could define the different treatment between the periodical itself and the images thereof. Once downloaded, protected content may be accessed and used by the end user off-line in the manner determined by the license associated with the protected content. With a combination of on-line and off-line subscription, many models can be constructed using the subscription based DRM system and method of the present invention.

As an example, a subscription based DRM system may be used in a storefront application. A storefront may be any on-line e-commerce site that offers protected content for sale. In this regard, distribution point 128 shown in DRM system 100 of FIG. 2 may be such a storefront. End user 114 activates client 106 and obtains public and private keys. The end user then joins a subscription list by responding to a subscription offer in the storefront and makes payment, or satisfies other conditions. Subscription list manager 120 pulls each public key and associates the public key with end user's identity. End user then attempts to download protected content such as a document that is part of a subscription collection. The storefront validates the end user's membership to the subscription through subscription list manager 120, retrieves end user's public key from subscription list manager 120, and makes a request to license server 110 for the licenses associated to the requested protected content. License server 110, after verifying authenticity of the request, issues licenses 116 to the storefront. The storefront then pre-packages the license with protected content 108 and makes it available for download by end user 114 as discussed previously. End user 114 can then download protected content 108 and transparently use protected content 108 in the manner dictated by issued license.

In another example, a subscription based DRM system and method of the present invention may be used in a delivery engine application that provides secure delivery of protected content such as documents. For instance, end users 114 may sign up as a subscriber to content 108 provided by Company A that owns or controls content 108, and activates a client via activation server 102 to obtain keys. Company A works with Company B that offers a secure digital delivery service to outsource the document delivery portion of its subscription service offering. The outsourced document delivery may be for delivery of financial statements or other type of documentation requiring protection and restricted use. Such outsourcing may be beneficial to Company A because Company B may be more efficient and cost effective in this particular function of document delivery. Company B thus serves as a "delivery engine" controls subscription list manager 102 to manage the list of end users 114 that receive documents, i.e. a subscription list which associates subscribing customers of Company A with their public key obtained during the activation stage. Of course, there could be more than one subscription list, for example a list of preferred customers, a list of specific types of customers, and the like.

When Company A has a document to deliver to its subscribers, it prepares the document and provides it to Company B for delivery. Company A then instructs Company B to deliver the document to users in one or more subscription list(s), for example, to most preferred customers. Company B sends a request to license server 110 to issue licenses 116 for each customer, i.e. user 114 in the list of most preferred customers, each customer being associated with a particular public key. Once requested licenses 116 are issued by license server 110, Company B receives licenses 116, pre-packages the documents with the licenses 116', and delivers them to the subscribing customers in the most preferred customer list. Because the documents are pre-packaged 116' with the required license, the subscribing customers need not conduct an additional transaction to use the protected content in accordance with the license 116. Thus, each end user that receives the pre-packaged license can receive and access the protected document transparently without further activations.

Another example of the subscription based DRM system and method is in an enterprise application. Distribution point 128 in such an application may be a computer application that is integrated with a mail server, or other application of the enterprise. Additionally, the enterprise application may maintain the subscription list in any appropriate manner as previously described. In this enterprise application example, end users 118 such as Person A, Person B, and Person C, are activated through activation server 122. When Person A sends a protected document to Person B and Person C, distribution point 128 intercepts the document and makes a request to license server 110 for a license 116 on behalf of Person B and Person C. Distribution point 128 then retrieves public keys for Person B and Person C and uploads the public keys to license server 110 which issues licenses 116 granting Person B and Person C rights to the protected document sent by Person A.

Once licenses 116 are received from license server 110, distribution point 128 pre-packages the protected document with the issued license 1161 and inserts it to the normal mail server workflow so that the mail server routes the protected document to Person C and Person B. Both Person B and Person C can then access and use the received document transparently when they check their respective e-mails in accordance with the issued license.

Another example of subscription based DRM system and method is a digital music store application. In such an application, a music company, for instance, an online music store, may offer a subscription to customers as users 114 where for a predetermined fee, users 114 are allowed access to unlimited (or limited) on-line streaming use of the music store's music catalog titles, and download a predetermined number of music titles.

When a subscribing user 114 seeks to access the music store's music catalog, DRM system authenticates the subscribing user 114 with activation server 102 and ensures that the user is identified in a subscription list of subscription list manager 120 before allowing access to the music catalog and the titles therein. As the user downloads various music titles as content 108, from the music store, license server 110 can keep track of the number of titles user 114 has downloaded so that if the maximum number of downloads has not been exceeded, the music store sends a request to the license server to generate licenses 116 for the selected titles. Once license server 110 issues the required licenses, the online music store pre-packages the protected title with the appropriate license 116 using a document packaging application. The user can then transparently download the selected titles from the music store.

Further, the subscription based license of the preferred embodiment permits activation prior to the existence of the content. For example, a user can subscribe to receive a live streaming event prior to the event.

It should again be understood that whereas the terms "server" and "client" are used to describe the devices for implementing the present invention in the illustrated embodiments above, these terms should be broadly understood to mean any appropriate device or devices for executing the described function.

Communication between the various devices can be accomplished through any channel, such as a local area network (LAN), the Internet, serial communications ports, and the like. The communications channels can use wireless technology, such as radio frequency or infra-red technology. The various elements of the preferred embodiment such as the various servers and databases connected thereto are segregated by function for the purpose of clarity. However, the various elements can be combined into one device or segregated in a different manner. For example, software package, and public and private key pair can be a single executable file and data files, or plural files or modules stored on the same device or on different devices. The software package can be any exchange of information that permits license activation and need not include a rendering application, a public key can be any type of identification tag or code. Further, the function of the various devices can be combined. For example, a single device can accomplish the function of license server 110 activation server 102, subscription list manager 120, and client 106. Also, the functions can be combined or segregated into any number and configuration of devices. The various components and modules have separate utility and may exist alone or in combination.

Any protocols, data types, or data structures can be used in accordance with the invention. Moreover, any appropriate means of expressing usage rights and conditions may be used in implementing the present invention. For instance, as previously noted, a rights language, e.g. a grammar such as XrML™ can be used.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications as are encompassed by the appended claims and legal equivalents.

What is claimed:

1. A rights management system for managing use of items having usage rights associated therewith, said system comprising:
    an activation device adapted to issue a software package that enforces usage rights to control use of an item, said software package comprising a public key and a private key associated with a subscribed user;
    a user device adapted to receive said software package, receive a license having usage rights specifying a manner of use and being associated with the item, and allow said subscribed user to access said item in accordance with said license;
    means for receiving a license request for the item on behalf of the subscribed user;
    a license device adapted to issue said license associated with said item;
    a subscription managing device including a subscription list having the public key associated with the subscribed user; and
    a distribution point requesting and receiving the license from the license device, said distribution point further pre-packaging the received license with said item,
    wherein said license device issues the license based on the identity of the subscribed user by communicating with said subscription managing device and verifying that the public key associated with said subscribed user seeking access to and use of the item is in said subscription list prior to issuing said license, and
    said pre-packaged license and the item are delivered or made available to said subscribed user.

2. The rights management system of claim 1, wherein license requests from said distribution point include a list of subscribed users and their respective public keys and a content ID for which licenses are to be issued.

3. The rights management system of claim 1, wherein license requests from said distribution point are for multiple protected content for which the licenses are to be issued.

4. The rights management system of claim 1, further comprising a plurality of subscribed users, each of said subscribed users having a public key as an identification mechanism.

5. The rights management system of claim 4, wherein said subscription managing device maintains a list of the identity of the subscribed users via said public key associated with each of said subscribed users.

6. The rights management system of claim 5, further comprising a plurality of items of protected content.

7. The rights management system of claim 6, wherein said plurality of items of protected content comprise at least one of a text file, an audio file, a video file, and digital multimedia files.

8. The rights management system of claim 1, further comprising a plurality of items of protected content.

9. The rights management system of claim 1, wherein said distribution point is adapted to pre-package said license from said license device with said item for each user in said subscription list.

10. The rights management system of claim 9, wherein said distribution point is further adapted to count the number of items accessed by said subscribed user.

11. The rights management system of claim 10, wherein said subscription managing device is further adapted to remove said subscribed user from said subscription list when a predetermined number of items is accessed by said subscribed user.

12. The rights management system of claim 1, wherein said distribution point is an on-line storefront application.

13. The rights management system of claim 1, wherein said subscription managing device also includes a mail server directory.

14. The rights management system of claim 1, wherein said license further comprises one or more state variables representing a status of at least one of said item, said usage right, and said license.

15. The rights management system of claim 14, wherein said subscribed user is only allowed to access said item until said subscription expires or after a period of time lapses, in accordance with said usage right and said one or more state variables.

16. The rights management system of claim 1, wherein system is implemented with one or more hardware and/or software components.

17. A method for managing use of items having usage rights associated therewith, said method comprising the steps of:
providing, by an activation device, a software package to a user device of a subscribed user, said software package enforcing a license having usage rights to control use of an item and having a public key and a private key associated with said subscribed user;
storing, by a subscription managing device, the public key associated with said subscribed user in a subscription list corresponding to said item;
receiving, by a distribution point, a request from said subscribed user to access and use said item;
requesting, by said distribution point, the license from a license device;
issuing a license based on the identity of the subscribed user by:
verifying that said subscribed user requesting access to said item is listed in said subscription list based on verifying that the public key associated with said user is in said subscription list prior to issuing said license; and
issuing, by said license device, the license that grants usage rights to said subscribed user to use said item, if said public key associated with said user is in said subscription list;
receiving, by said distribution point, the license from the license device;
pre-packaging, by said distribution point, the received license with said item; and
delivering or making available, by said distribution point, said pre-packaged license with said item to said subscribed user.

18. The method of claim 17, further comprising a plurality of items of protected content adapted to be accessed by said subscribed user.

19. The method of claim 18, further comprising plural subscribed users and further comprising the step of issuing a plurality of licenses granting usage rights to each of said plural subscribed users to use said plurality of item of protected content.

20. The method of claim 19, further comprising the step of verifying that each of said plural subscribed users are listed in said subscription list prior to issuing each license that grants usage right to use each of said plurality of protected content.

21. The method of claim 19, further comprising the step of counting the number of items of protected content used by each of said plural subscribed users.

22. The method of claim 21, further comprising the step of removing said public keys associated with the subscribed users when a predetermined number of items of protected content is used by the subscribed users.

23. The method of claim 17, wherein said license further comprises one or more state variables representing a status of at least one of said item, said usage right, and said license.

24. The method of claim 23, wherein said subscribed user is only allowed to access said item until said subscription expires or after a period of time lapses, in accordance with said usage right and said one or more state variables.

25. The method of claim 17, wherein said method is implemented with one or more hardware and/or software components configured to perform the steps of the method.

26. The method of claim 17, wherein said method is implemented with one or more computer readable instructions embedded on a computer readable medium and configured to cause one or more computer processors to perform the steps of the method.

27. The system of claim 1, wherein said user device is adapted to receive a client component that includes an engine for parsing or rendering protected items, said client component is installed in the user device after receipt at the user device, and said client component is configured for interpreting said license.

28. The system of claim 1, wherein said system provides subscribed users access to a plurality of items having respective usage rights and controlled by said software package.

29. The method of claim 17, further comprising providing a client component including an engine for parsing or rendering protected items to said user device, said client component being installed in the user device after receipt at the user device, and said client component configured for interpreting said license.

* * * * *